No. 738,243. PATENTED SEPT. 8, 1903.
L. ROMERO & E. RODRIGUEZ-Y-ARCE.
PROCESS OF FORMING ARTICLES COMPOSED OF PLASTIC MATERIAL.
APPLICATION FILED FEB. 28, 1903.
NO MODEL.
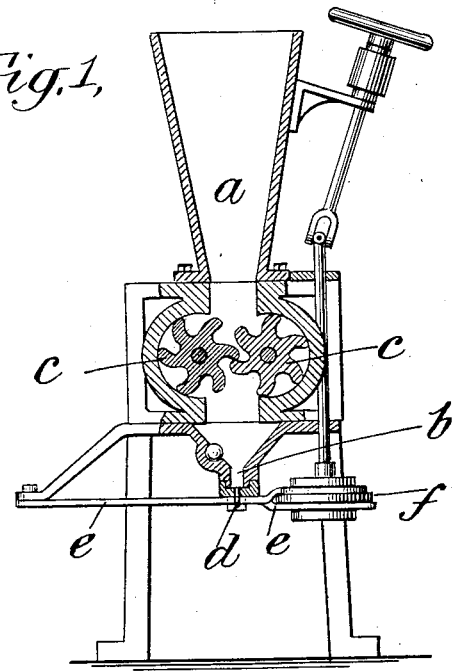
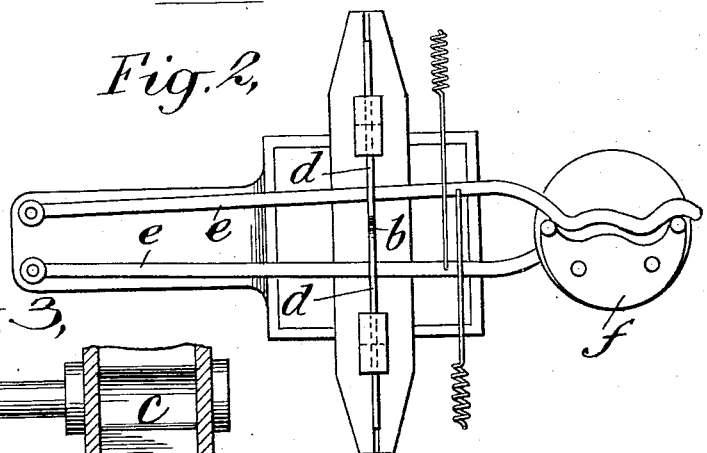
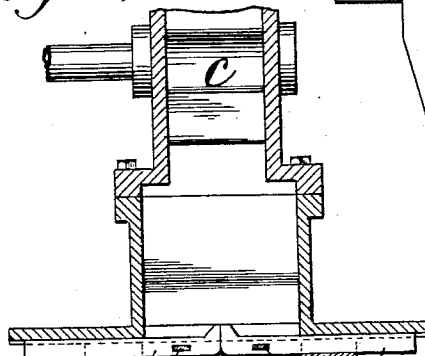

No. 738,243. Patented September 8, 1903.

UNITED STATES PATENT OFFICE.

LUIS ROMERO AND EVERARDO RODRIGUEZ-Y-ARCE, OF MEXICO, MEXICO.

PROCESS OF FORMING ARTICLES COMPOSED OF PLASTIC MATERIAL.

SPECIFICATION forming part of Letters Patent No. 738,243, dated September 8, 1903.

Application filed February 28, 1903. Serial No. 145,485. (No specimens.)

*To all whom it may concern:*

Be it known that we, LUIS ROMERO and EVERARDO RODRIGUEZ-Y-ARCE, citizens of Mexico, and residents of the city of Mexico, Mexico, have invented certain new and useful Improvements in Processes of Forming Articles Composed of Plastic Material, of which the following is a specification, reference being had to the accompanying drawings, forming a part thereof.

Our invention consists in a novel process for forming articles composed of plastic material which consists in forcing the plastic material through an opening and simultaneously varying the size or shape, or both, of said opening.

Our invention may be applied to many uses and the production of many and varied objects, such as articles of food, certain classes of pottery, ornamental brick, artificial stone, and tilework, &c.

One of the uses to which we have so far successfully applied our invention is in the production of an article of food known in Mexico as "tortillas." The tortilla is a staple article of food in Mexico and comprises a thin flat disk about one-sixteenth to one-eighth of an inch in thickness and about five to six inches in diameter composed of ground corn and water suitably baked in an oven or upon a griddle.

In the following we will describe our invention as applied to the production of tortillas, (to a point ready for cooking,) it being understood that we in no way limit ourselves to the production of such articles, as obviously many other articles—such, for instance, as above mentioned—may be produced by our process.

In carrying out our process we place a mass of the plastic material—in this case ground corn and water—in a suitable receiver and force it through a discharge-orifice. Adjacent to the discharge-orifice we arrange suitable formers, which in their movement vary the size or shape, or both, of the discharge-orifice. By operating the formers while the material is being forced through the discharge-orifice we are enabled to produce an object of the desired shape. In this instance the discharge-opening will have a width equal to the desired thickness of a tortilla and a length equal to or greater than the diameter thereof. The formers will be arranged at opposite ends of the discharge-orifice and will be moved toward and away from each other to vary the length of the said orifice. In the production of a single tortilla the formers will start from a point at or near the middle of the discharge-orifice and will move outward at a gradually-decreasing speed until at the limit of their outward movement, when they will start to move inwardly and will so move inwardly at a gradually-increasing speed until they are again brought substantially together. During this time the plastic material will be forced at a substantially uniform speed through the orifice and past the formers, with the result that a thin, flat, and substantially circular disk of the material will be formed.

In the drawings we have illustrated a form of apparatus in which our process may be carried out; but it will be understood that our process is by no means limited to such apparatus, and that the apparatus *per se* forms no part of this present invention.

In the drawings, Figure 1 shows a transverse section of a machine adapted for carrying out our improved process. Fig. 2 shows an under side view of certain parts, including the formers and the means for operating them. Fig. 3 shows a central vertical transverse section through the machine, taken at right angles to Fig. 1.

A receiver is shown at $a$, having a discharge $b$ and provided with means comprising toothed impelling-wheels $c\ c$ for forcing the material from the receiver out through the discharge-opening $b$.

Two formers $d\ d$ are provided, comprising thin plates with their front ends adapted to reciprocate in the discharge-opening $b$. The formers are engaged by operating-levers $e\ e$, operated by cams $f$. The cams $f$ are arranged to be operated simultaneously with the operation of the impelling-wheels $c\ c$, so as to form the material as it is being advanced in the manner above described.

What we claim is—

1. A process for forming or shaping articles composed of plastic material, which consists in forcing the plastic material through an opening and simultaneously varying the size of the opening, to form or shape the material while it is being forced therethrough.

2. A process for forming or shaping articles composed of plastic material, which consists in forcing the plastic material through an opening and simultaneously varying the shape of the opening, to form or shape the material while it is being forced therethrough.

3. A process for forming or shaping articles composed of plastic material, which consists in forcing the plastic material through an opening and simultaneously varying the size and shape of the opening, to form or shape the material while it is being forced therethrough.

In witness whereof we have hereunto set our hands.

LUIS ROMERO.
EVERARDO RODRIGUEZ-Y-ARCE.

Witnesses to signature of Luis Romero:
A. J. MOLTER,
C. F. CARRINGTON.

Witnesses to signature of Everardo Rodriguez-y-Arce:
MANUEL RUIZ,
BERNARDO ROMERO.